My invention relates to certain compositions comprised of blends containing the normally crystalline polymers of vinylidene chloride and to oriented articles made from such compositions which have an improved dimensional stability.

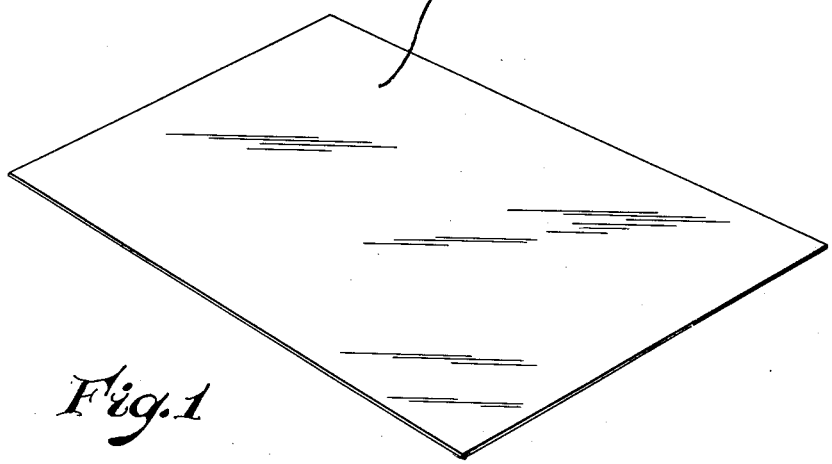
Fig. 1 — Dimensionally stabilized oriented film of vinylidene chloride copolymer and up to 25% of essentially linear and unbranched, high density polyethylene polymer
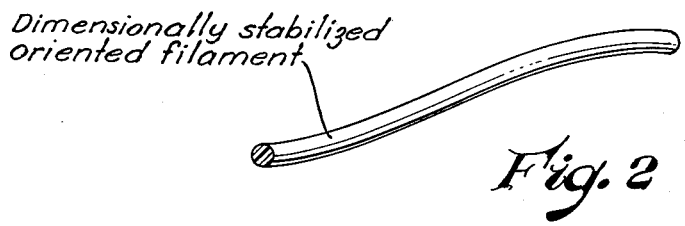
Fig. 2 — Dimensionally stabilized oriented filament
INVENTOR.
Carl P. Zupic
BY
Griswold & Burdick
ATTORNEYS 3,075,946
SARAN COMPOSITIONS AND DIMENSIONALLY STABLE PRODUCTS THEREFROM
Carl P. Zupic, Midland, Mich., assignor to The Dow Chemical Company, Midland, Mich., a corporation of Delaware
Filed Sept. 21, 1959, Ser. No. 841,663
9 Claims. (Cl. 260—45.5)

The present application is a continuation-in-part of my application for United States Letters Patent having Serial No. 560,665, which was filed on January 23, 1956, now abandoned.

Prior to my invention, it was commonly recognized and accepted in and by the art that oriented articles (such as films and filaments) which were fabricated from the normally crystalline polymers and copolymers of vinylidene chloride, including vinylidene chloride/vinyl chloride and vinylidene chloride/acrylonitrile copolymers, suffered the shortcoming of having extremely poor dimensional stability at elevated temperatures. As a consequence it was a common requirement to heat treat or pre-shrink the oriented articles at a high enough temperature for them to be subsequently useful and free from excessive shrinkage under anticipated conditions.

It would be beneficial if such requirements could be avoided since they involve considerable additional manufacturing expense for equipment and handling.

The principal objective and purpose of my invention is to provide compositions comprised essentially of the normally crystalline polymers of vinylidene chloride which advantageously can be fabricated into oriented articles which have an improved dimensional stability upon exposure to heat at elevated temperatures. It is also an important object of my invention to provide such compositions in a form in which they substantially retain the essential desirable characteristics and features of the conventionally known compositions of the normally crystalline polymers of vinylidene chloride (which frequently are generically referred to as sarans).

Surprisingly enough, despite the notorious and well-known propensity of oriented articles from saran compositions to shrink under the influence of heat at elevated temperatures, I have discovered certain novel and unanticipated saran compositions which are adapted to provide oriented articles which have a sufficiently improved dimensional stability to obviate the usual requirement to heat treat them against shrinkage.

According to my invention, compositions comprised essentially of the normally crystalline polymers of vinylidene chloride, particularly copolymers of vinylidene chloride and vinyl chloride or copolymers of vinylidene chloride and acrylonitrile and especially those which contain at least about 80 weight percent of polymerized vinylidene chloride copolymerized in the polymer molecule, can be rendered to have a significantly increased dimensional stability by incorporating in the composition an amount up to about 25 weight percent, based on composition weight, of normally solid, essentially linear and unbranched, high density polyethylene.

For most advantageous results, taking the various involved considerations into account, I prefer to use between about 0.5 and 10 weight percent, based on composition weight, of the essentially linear and unbranched, high density polyethylene.

I have observed that oriented articles fabricated from compositions in accordance with my invention have a remarkably lessened tendency to shrink even when exposed to temperatures as high as the boiling point of water as compared to articles from ordinary saran compositions. They may be employed safely and successfully in many applications, such as in paperboard laminated films for bottle caps and the like, without necessitating a pre-shrinking heat treatment to avoid the occurrence of an intolerable shrinkage in subsequent use. Furthermore, my compositions are substantially equivalent in most characteristics save their reduced tendency to shrink.

I prefer to employ, in the practice of my invention, a polyethylene that has an essentially linear and unbranched molecular structure and, desirably, an apparent molecular weight (as may be determined from observation of such of its intrinsic properties as kinetic measurement of melt viscosity and the like) that is generally in excess of 20,000 or so to as high as 3,000,000 or higher. As will be appreciated by those who are skilled in the art, however, any normally solid (i.e., at room temperatures of from 20–25° C.) linear, macromolecular polyethylene can be utilized with benefit in the practice of my invention.

Such macromolecular, essentially linear polyethylene may advantageously be prepared according to various recently proposed techniques. For example, according to a process first proprosed by Professor Karl Ziegler and his associates in Germany, ethylene may be polymerized into an essentially linear and unbranched molecular structure which may advantageously have such greater molecular weights and corresponding melt viscosities under relatively low pressures ranging from 1 to 100 atmospheres with catalyst mixtures of strong reducing agents and compounds of Groups IV–B, V–B, and VI–B metals of the Mendeléeff Periodic System. Aluminum alkyls admixed with salts of titanium or zirconium are utilized with particular benefit in this process.

Other known processes for producing polyethylene having characteristics of the essentially linear and macromolecular polymer products may employ such materials for catalysts as chromium oxide on silicated alumina; hexavalent molybdenum compounds; and charcoal-supported nickel-cobalt. Belgian Patent No. 533,362; Canadian Patents Nos. 502,597 and 525,884; and U.S. Patents Nos. 2,586,322 and 2,816,883 disclose typical varieties of macromolecular linear polyethylenes which have recently become available to the art and which are readily distinguishable from the conventional varieties of branch structured type polyethylenes which are sometimes referred to as "polythenes." The older "polythene"-type polyethylenes, as is well known, are commonly and frequently prepared by polymerizing monomeric ethylene in the presence of polymerization-favoring quantities of oxygen and water, having a pH greater than 7, under a pressure of at least 500 and, advantageously, 1,000 atmospheres and at temperatures of from 150° C. to 275° C. Polyethylene products prepared in this manner generally have substantially branched or side chain-containing molecular structures and seldom attain a molecular weight in excess of about 40,000. They usually melt at about 110° C. and have densities in the general range of 0.92 or so gram per cubic centimeter.

The above-mentioned macromolecular polyethylenes, as is apparent, ordinarily have significantly greater molecular weights (or at least greater melt viscosities) than the typical "polythene" polymers. In addition, macromolecular polyethylene generally has a greater density than the "polythene" product. The density of macromolecular, essentially linear polyethylene is usually in the neighborhood of at least 0.94 to 0.96 gram per cubic centimeter. It is also more resistant to the softening effects of heat and, in general, has higher softening, melting and heat distortion temperatures than does the "polythene" polymer. The melting point of macromolecular polyethylene, for example, is usually in the neighborhood of 125–135° C., particularly in materials having apparent molecular weights in excess of about 10,000. It is, as mentioned, essentially an unbranched, linear polymer and may be made to contain less than 3 and even less than 0.03 methyl groups per 100 methylene groups in the polymer molecule. It is found to be more crystalline in nature than polyethylene prepared by the previously employed, "polythene"-manufacturing, higher pressure methods. The macromolecular polyethylene which I use in practice of my present invention is, for convenience, sometimes referred to as an "ultrathene" to distinguish it from the ordinarily lower apparent molecular weight, less dense and crystalline and substantially more branched "polythene" polyethylene prepared according to earlier known techniques.

The normally crystalline vinylidene chloride polymers that I employ in the practice of my invention are, as is well known, not only the homopolymers of vinylidene chloride but also the normally crystalline copolymers of this monomer with one or more other ethylenically unsaturated monomeric materials that are capable of being copolymerized with vinylidene chloride to provide a normally crystalline copolymer product, as may be determined by X-ray defraction studies. Thus, the saran that I use for the present dimensionally stable compositions may advantageously be a copolymer of vinylidene chloride and vinyl chloride or a copolymer of vinylidene chloride and acrylonitrile or a copolymer of vinylidene chloride and acrylic acid or the ester derivatives of acrylic acid, such as methyl acrylate, ethyl acrylate, propyl acrylate, butyl acrylate and the like, or mixtures thereof. If desired, the saran resin that I utilize may be a copolymer of vinylidene chloride and vinyl acetate, for example. I find it particularly advantageous to employ crystalline saran copolymers of vinyl chloride and vinylidene chloride as may contain at least about 80 weight percent of vinylidene chloride polymerized in the copolymer molecule or such copolymers of acrylonitrile and vinylidene chloride as may contain at least about 60 and, preferably, from about 85 to about 95 weight percent of vinylidene chloride polymerized in the copolymer molecule.

The compositions of my invention may be fabricated into films, filaments and other shaped articles by conventional techniques, generally of the variety utilized for the shaping of melt extrudable thermoplastic compositions.

Of course, my compositions can be compounded and filled in the usual manner with conventional fillers, such as carbon black, titanium dioxide, and so forth, ordinarily used for such purposes. Likewise, they can be prepared to contain suitable quantities of such other desired ingredients as plasticizers, lubricants and other additament materials often employed in saran compositions, such as coloring agents, including dyestuffs and pigments, and the like.

In order to illustrate my invention with a series of examples, although it is not my wish to be restricted thereto, I prepared several different compositions comprised of copolymers of vinylidene chloride and vinyl chloride and essentially linear and unbranched polyethylene of varying molecular weight which was polymerized according to the herein-described Ziegler process. I extruded the compositions into films (as schematically depicted in FIGURE 1 of the accompanying drawing) which were oriented and I then compared them with similarly extruded and oriented films from a composition consisting essentially of the same copolymer of vinylidene chloride and vinyl chloride.

Each of the compositions which I prepared for my tests was based on a saran composition comprised of about 91.5 parts by weight of a normally solid and crystalline copolymer of vinylidene chloride and vinyl chloride which contained about 85 weight percent of polymerized vinylidene chloride in the copolymer molecule; 3 parts by weight of 3(2-xenoxy) 1,2-epoxy propane; 3 parts by weight of a phthalyl glycollate plasticizer which I had obtained under the tradename "Santicizer E–15"; and 2.5 parts by weight of tertiary butyl salol. In formulating the compositions of my invention I compounded the saran composition with desired amounts of the polyethylene (which was in powder form) by mechanically blending them in a conventional Hobart mixer prior to extrusion.

I performed the extrusion and orientation according to conventional techniques. Thus, the compositions were extruded in tubular film form at about 170° C., after which I super-cooled them in an aqueous bath at about 10° C. and subsequently stretched them at room temperature by means of an internal distending gas bubble until about a 4:1 stretch ratio has been achieved in each major direction of the film to produce material having a thickness of about 1.5 mils. The procedure I followed for preparation of the samples tested was generally similar to that disclosed in United States Letters Patent No. 2,452,080. My methods for physically testing the films are those which are commonly accepted and utilized in and by the art.

In Table I which follows there are reproduced various data on several films which I prepared from the saran composition alone (for purposes of comparison) and from the saran composition compounded to provide compositions containing 2 and 15 percent by weight, respectively, of the essentially linear and unbranched polyethylene having a molecular weight of about 54,000 and a melt index (according to ASTM D–1238–52T) of about 3. In Table II there is given the shrinkage at 100° C. of several additional films which I similarly prepared from the saran composition alone and from the saran composition compound to provide compositions containing 0.5 and 5.0 percent by weight, respectively, of a polyethylene having a molecular weight of about 70,000 with a correspondingly higher melt index and 10.0 percent by weight of a polyethylene having a molecular weight of about 210,000 with, likewise, a correspondingly still higher melt index.

TABLE I

*Film Properties of Various Compositions*

| Percent by weight of polyethylene (M.W. 54,000) in composition | 0 | | 2 | | 15 | |
|---|---|---|---|---|---|---|
| | C[1] | L[2] | C | L | C | L |
| Tensile strength, p.s.i. | 20,100 | 14,800 | 14,100 | 11,800 | 9,150 | 10,600 |
| Percent elongation | 51 | 67 | 70 | 125 | 27 | 300 |
| Elmendorf tear resistance, gms. | 15 | 15 | 22 | 28 | 27 | 37 |
| Percent shrinkage at 100° C. | 19 | 22 | 7.5 | 8.5 | 4.3 | 4.3 |
| Water vapor transmission, gms./100 in.²/24 hrs. at 95° F. and 90 percent R.H. | 0.124 | | 0.135 | | 0.094 | |

[1] C represents cross direction.
[2] L represents lengthwise direction.

TABLE II

*Percent Shrinkage at 100° C. of Flms of Various Compositions*

| Percent by weight of polyethylene in composition | Compositions with 70,000 M.W. polyethylene | | Compositions with 210,000 M.W. polyethylene | |
|---|---|---|---|---|
| | L | C | L | C |
| 0 | 22 | 19 | 22 | 19 |
| 0.5 | 17 | 16 | | |
| 2.0 | | | | |
| 5.0 | 5 | 7 | | |
| 10.0 | | | 8 | 9 |

Analogous results are obtainable with oriented monofilaments prepared from compositions according to my invention. Such a shaped article has also been schematically represented in FIGURE 2 of the drawing.

Analogous results are also obtainable with compositions according to my invention prepared with other of the described essential normally crystalline saran ingredients. Thus, a commensurate degree of improvement is noted when the foregoing tests are repeated with a blend of the same or any other linear, high density macromolecular polymer and an 80:20 saran copolymer of vinylidene chloride and acrylonitrile or an 85:15 saran copolymer of vinylidene chloride and vinyl acetate or a 90:10 copolymer of vinylidene chloride and ethyl acrylate or with any other of the normally crystalline sarans which I have indicated to be within the scope of my present invention.

In order to demonstrate that the dimensional stability of the compositions within the scope of my present invention are very much greater and significantly improved over the dimensioned stability of analogous compositions prepared from a blended formulation of similar or identical saran compositions with conventional branch-structured, low molecular weight, low density polyethylene when such compositions are fabricated into various shaped articles, particularly films and filaments, I prepared several films in the above-described manner from compositions of a normally solid saran copolymer of vinylidene chloride and vinyl chloride which contained about 85 weight percent of polymerized vinylidene chloride in the copolymer molecule and a polyethylene polymer that was not of the essentially linear and unbranched, high density, high molecular weight and high melting variety but was the conventional, branch-structured, low density variety of "polyethylene"-type polyethylene that is commercially available and was obtained under the trade-designation "Bakelite DGZB" whose apparent molecular weight (as determined by conventional procedure at 130° C. in tetralin using the modified Staudinger equation) was less than 20,000. Each of the "polythene"-type polyethylene-containing films were tested in the same way as above-described for blends in accordance with my invention, with the results of the tests being set forth in the following Table III:

TABLE III

*Film Properties of Compositions of Saran Blended With Low Density, Branch-Structured "Polythene"-Type Polyethylene*

| Percent by weight of conventional branch structured polyethylene (M.W. less than 20,000) in composition | 0 percent | | 0.5 percent | | 2 percent | | 5 percent | | 10 percent | |
|---|---|---|---|---|---|---|---|---|---|---|
| | C | L | C | L | C | L | C | L | C | L |
| Tensile strength, p.s.i. | 20,100 | 14,800 | | 12,800 | 13,500 | 9,100 | 13,600 | 13,500 | | |
| Percent elongation | 51 | 67 | | 115 | 39 | 120 | 25 | 106 | | |
| Elmendorf tear resistance, gms. | 15 | 15 | 18 | 26 | 17 | 21 | 19 | 18 | 18 | 16 |
| Percent shrinkage at 100° C. | 19 | 22 | 15 | 15 | 13 | 13 | 16 | 17 | 18 | 24 |

In order to still further show the surprising and unexpected results of my invention, I prepared additional blends of a saran copolymer (the same as used in the above illustrations) with linear, normally solid polypropylene having a melt index (according to ASTM D–1238–52T on the polyethylene scale) of about 0.9. Each of the polypropylene-containing film samples examined was prepared and tested in a manner analogous to that which I have described above. The results are set forth in the following Table IV, in which, for convenience, I have duplicated some of the preceding information to more readily show the contrast involved between my present compositions and analogous saran blends of other polyolefins.

TABLE IV

*Properties of Various Saran-Polyolefin Blends*

Tensile Strength (p.s.i. × 10⁻³)

| Polyolefin | Amount of 85:15 vinylidene chloride/vinyl chloride saran copolymers in blend | | | | | | | | | |
|---|---|---|---|---|---|---|---|---|---|---|
| | 0 percent | | 2 percent | | 5 percent | | 10 percent | | 15 percent | |
| | C | L | C | L | C | L | C | L | C | L |
| "Bakelite DGZB" | 20.1 | 14.8 | 13.5 | 9.1 | 13.6 | 13.5 | | | | |
| Linear polyethylene [1] | 20.1 | 14.8 | 14.1 | 11.8 | | | | | 9.1 | 10.6 |
| Polypropylene | 20.1 | 14.8 | 8.7 | 6.2 | 8.9 | 4.5 | 4.5 | 3.7 | | |

Percent Elongation

| "Bakelite DGZB" | 51 | 67 | 39 | 120 | 25 | 106 | | | | |
| Linear polytheylene | 51 | 67 | 70 | 125 | | | | | 27 | 300 |
| Polypropylene | 51 | 67 | 26 | 65 | 20 | 48 | 20 | 40 | | |

TABLE IV—Continued

Properties of Various Saran-Polyolefin Blends—Continued

Percent shrinkage at 100° C.

| | | | | | | | | | | |
|---|---|---|---|---|---|---|---|---|---|---|
| "Bakelite DGZB" | 19 | 22 | 13 | 13 | 16 | 17 | 18 | 24 | 4.3 | 4.3 |
| Linear polyethylene | 19 | 22 | 7.5 | 8.5 | | | | | | |
| Polypropylene | 19 | 22 | 17 | 17 | 17 | 18 | 10 | 11 | | |

Tear resistance (Elmendorf grams)

| | | | | | | | | | | |
|---|---|---|---|---|---|---|---|---|---|---|
| "Bakelite DGZB" | 15 | 15 | 17 | 21 | 19 | 18 | 18 | 16 | 27 | 37 |
| Linear polyethylene | 15 | 15 | 22 | 28 | | | | | | |
| Polypropylene | 15 | 15 | 15 | 22 | 13 | 19 | 19 | 20 | | |

[1] Molecular weight about 54,000; melt index about 3.

As is apparent, and as is the case with "polythene"-type polyethylene, the polypropylene did not retard shrinkage of the film from the saran blend composition at 100° C. as did the compositions of my present invention which contain linear, macromolecular, high density polyethylene. The polypropylene/saran blends behave a great deal like the blends of saran with the branch-structured, "polythene"-type polyethylene.

What I wish to claim and secure is:

1. A composition adapted to be fabricated into oriented articles having improved dimensional stability upon exposure to heat at elevated temperatures, which composition comprises (a) between about 75 and about 99.5 weight percent, based on composition weight, of a normally crystalline vinylidene chloride polymer resin and (b) between about 0.5 and about 25 weight percent, based on composition weight, of a normally solid, essentially linear, macromolecular polyethylene having a density in the range of about 0.94 to 0.96 gram per cubic centimeter and a melting point between about 125° and about 135° C.

2. The composition of claim 1, wherein the vinylidene chloride polymer resin is a copolymer of vinylidene chloride and vinyl chloride that contains at least about 80 weight percent, based on copolymer weight, of polymerized vinylidene chloride in the copolymer molecule.

3. The composition of claim 1, wherein the vinylidene chloride polymer resin is a copolymer of vinylidene chloride and ethyl acrylate that contains at least about 80 weight percent, based on copolymer weight, of polymerized vinylidene chloride in the copolymer molecule.

4. The composition of claim 1, wherein the vinylidene chloride polymer resin is a copolymer of vinylidene chloride and acrylonitrile that contains at least about 60 weight percent, based on copolymer weight, of polymerized vinylidene chloride in the copolymer molecule.

5. The composition of claim 1, wherein said essentially linear polyethylene has a molecular weight between about 20,000 and about 3,000,000.

6. The composition of claim 1 containing between about 0.5 and about 10 weight percent, based on composition weight, of said linear polyethylene.

7. An oriented shaped article consisting of the composition of claim 1.

8. An oriented film consisting of the composition of claim 1.

9. An oriented monofilament consisting of the composition of claim 1.

References Cited in the file of this patent

UNITED STATES PATENTS

| | | |
|---|---|---|
| 2,628,208 | Loukomsky | Feb. 10, 1953 |

FOREIGN PATENTS

| | | |
|---|---|---|
| 533,362 | Belgium | May 16, 1955 |
| 985,327 | France | July 17, 1951 |
| 827,552 | Germany | Jan. 10, 1952 |

OTHER REFERENCES

Neumann et al.: "Modern Plastics," August 1955, pages 117–120 and 122.

Schildknecht: "Vinyl and Related Polymers," pages 462, 463, 508, 509, Wiley, New York (1952).

Billmeyer: "Textbook of Polymer Chemistry," page 22, Interscience Pub., New York, 1957.